United States Patent

Rose

[11] Patent Number: 6,061,984
[45] Date of Patent: May 16, 2000

[54] UNDER FLOOR RECONFIGURABLE UTILITIES SUPPORT STRUCTURE

[76] Inventor: Robert L. Rose, 4705 E. St. John Rd., Phoenix, Ariz. 85032

[21] Appl. No.: 09/126,563

[22] Filed: Jul. 30, 1998

[51] Int. Cl.[7] ....................................................... E04C 2/52
[52] U.S. Cl. .............................. 52/220.1; 52/263; 52/646
[58] Field of Search .................................... 52/747.1, 263, 52/220.1, 653.1, 737.2, 737.6, 729.2, 646

[56] References Cited

U.S. PATENT DOCUMENTS

| | | | |
|---|---|---|---|
| 2,348,096 | 5/1944 | Schack | 248/68 |
| 2,384,158 | 9/1945 | Carpenter et al. | 248/68 |
| 2,912,197 | 11/1959 | Hudson | 248/49 |
| 3,547,385 | 12/1970 | Kindorf | 52/720 |
| 3,674,233 | 7/1972 | Van Buren, Jr. | 248/68 |
| 3,787,016 | 1/1974 | Laval, Jr. | 248/49 |
| 4,409,889 | 10/1983 | Burleson | 98/33 |
| 4,612,746 | 9/1986 | Higgins | 52/221 |
| 4,960,253 | 10/1990 | Perrault et al. | 248/68.1 |
| 5,144,781 | 9/1992 | Fitzner | 52/303 |
| 5,195,922 | 3/1993 | Genco | 454/57 |
| 5,263,296 | 11/1993 | Spera | 52/638 |
| 5,316,244 | 5/1994 | Zetena, Jr. | 248/49 |
| 5,393,020 | 2/1995 | Perrault et al. | 248/68.1 |
| 5,477,649 | 12/1995 | Bessert | 52/263 |
| 5,483,776 | 1/1996 | Poppe | 52/220.3 |
| 5,628,157 | 5/1997 | Chen | 52/263 |
| 5,697,193 | 12/1997 | Forslund, III et al. | 52/220.5 |

Primary Examiner—Carl D. Friedman
Assistant Examiner—Diane Saiz
Attorney, Agent, or Firm—Cahill, Sutton & Thomas, P.L.C.

[57] ABSTRACT

A plurality of struts extend upwardly from a subfloor and a plurality of racks interconnect selected rows of struts for supporting transmission lines and/or conduits. Each strut is formed of four orthogonally oriented C-channels having the edge of each leg curled inwardly to define a lip extending toward the base and each rack includes a similar C-channel. Each end of each rack is detachably attached to a C-channel of a strut by a bolt penetrating a plate at the rack end and threadedly engaging a nut captured in the C-channel of the strut. The transmission lines and conduits are secured to any of the C-channels of the struts and the racks by clamps having distal ends of two sections captured by the respective C-channel and an attachment mechanism securing the proximal ends of the sections to one another to retain the transmission lines and conduit clamped between the two sections. Disassembly of the transmission lines and conduits from the respective C-channels and disassembly of the racks from the struts involves unsecuring the proximal ends of each clamp from one another and withdrawing the distal ends of each clamp from the C-channel and disengaging the bolt from the captured nut.

24 Claims, 6 Drawing Sheets

UNDER FLOOR RECONFIGURABLE UTILITIES SUPPORT STRUCTURE

BACKGROUND OF THE INVENTION

1. Field of the Invention

The present invention relates to modular support structures for utilities, and more particularly, to reconfigurable utilities support structures disposed between the floor and the subfloor of a clean room.

2. Description of Related Art

A manufacturer of wafers for semiconductors, semiconductor fabricators and numerous other industries require a clean room within which to house manufacturing and/or fabricating equipment.

Conventionally, all utilities relating to clean room equipment, including electrical power and data transmission lines, and conduits conveying various gases and liquids, are routed to and from each piece of equipment through a space between the clean room floor and a subfloor. Whenever there is a change in equipment due to a change in production run, upgrading of equipment, etc., various of the transmission lines and conduits may have to be removed, added or rerouted.

The conventional support structure for conveying transmission lines and conduits to equipment disposed in the clean room incorporates vertical round posts bolted to a concrete subfloor for supporting both the floor of the clean room and extended horizontal supports attached by clamps. The supports support the various transmission lines and conduits. When the need to reroute transmission lines and/or conduits arises, the vertical posts may have to be relocated, further vertical posts may have to be added or existing vertical posts may have to be removed. Such addition or removal contemplates drilling holes in the concrete subfloor to receive bolts for retaining the base of each post. Such drilling creates dust that permeates everywhere and debris that must be cleaned up. For purposes of a clean room, such dust and debris may be fatal to the operation unless extraordinary efforts are undertaken to remove or control the dust and debris. Additionally, horizontal supports will have to be added or removed to conform with the added, removed or rerouted transmission lines and conduits along with attendant clamps for securing the transmission lines and conduits at the respective locations on the supports. This work, en toto, requires the services of numerous tradesmen having different technical skills. Because different technical skills must be used in predetermined order, any delays or problems experienced in one phase will result in inefficient use of technicians having other skills which cannot be exercised until completion of a previous work product.

Moreover, each new installation or reworked installation tends to have uniquely and nonuniformly sized supports and clamps for the transmission lines and conduits. Such nonuniformity is exacerbated by the number of reinstallations necessary for any change of equipment. The nonuniformity of an installation renders it impossible to make changes at a single location to accommodate installation/removal of new equipment in the clean room without extensive rerouting of numerous transmission lines and conduits. A nonuniform installation also renders it difficult and tedious to locate the particular transmission lines and conduits necessary to perform the installation/removal of equipment.

SUMMARY OF THE INVENTION

Uniformly sized four-way struts commensurate in length with the distance between a subfloor and floor of a clean room include a lower plate for adhered attachment to the subfloor with an epoxy or similar adhesive. The struts are located to define a rectangular pattern on two foot centers commensurate with the corners of two foot square floor tiles to support the adjacent corners of floor tiles. A plurality of horizontal racks of precut lengths of two feet are attached to the adjacent struts with preformed vertically positionable securing devices that permit racks to be readily added or removed as required. The transmission lines and conduits to be added or placed upon either the struts or the racks are secured in place by preformed removable and positionally adjustable clamps. Recording the location of each transmission line and conduit as a function of the adjacent floor tiles permits immediate and accurate access to each transmission line and conduit for any repair, replacement or rerouting purpose.

It is therefore a primary object of the present invention to provide a readily reconfigurable under floor support apparatus for routing transmission lines and conduits to floor mounted equipment.

Another object of the present invention is to provide uniformly sized vertical struts and uniformly sized horizontal racks for routing transmission lines and conduits which eliminate the need for numerous tradesmen skills during an installation or reinstallation.

Still another object of the present invention is to provide an inexpensive subfloor mounted apparatus for supporting a floor of a clean room and for providing routing for transmission lines and conduits to and from equipment used in the clean room.

Still another object of the present invention is to provide prefabricated readily unassemblable and disassemblable equipment to support and to route transmission lines and conduits.

A further object of the present invention is to provide inexpensive readily reconfigurable support structures for transmission lines and conduits disposed in the crawl space between a subfloor and a floor.

A yet further object of the present invention is to provide a method for installing and modifying a support structure for transmission lines and conduits disposed between a subfloor and a floor.

A yet further object of the present invention is to provide a method for installing, removing or relocating transmission lines and conduits for equipment used in a clean room of a manufacturing or a fabricating facility or a laboratory.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which.

DESCRIPTION OF THE PREFERRED EMBODIMENT

Figures 1, 2:
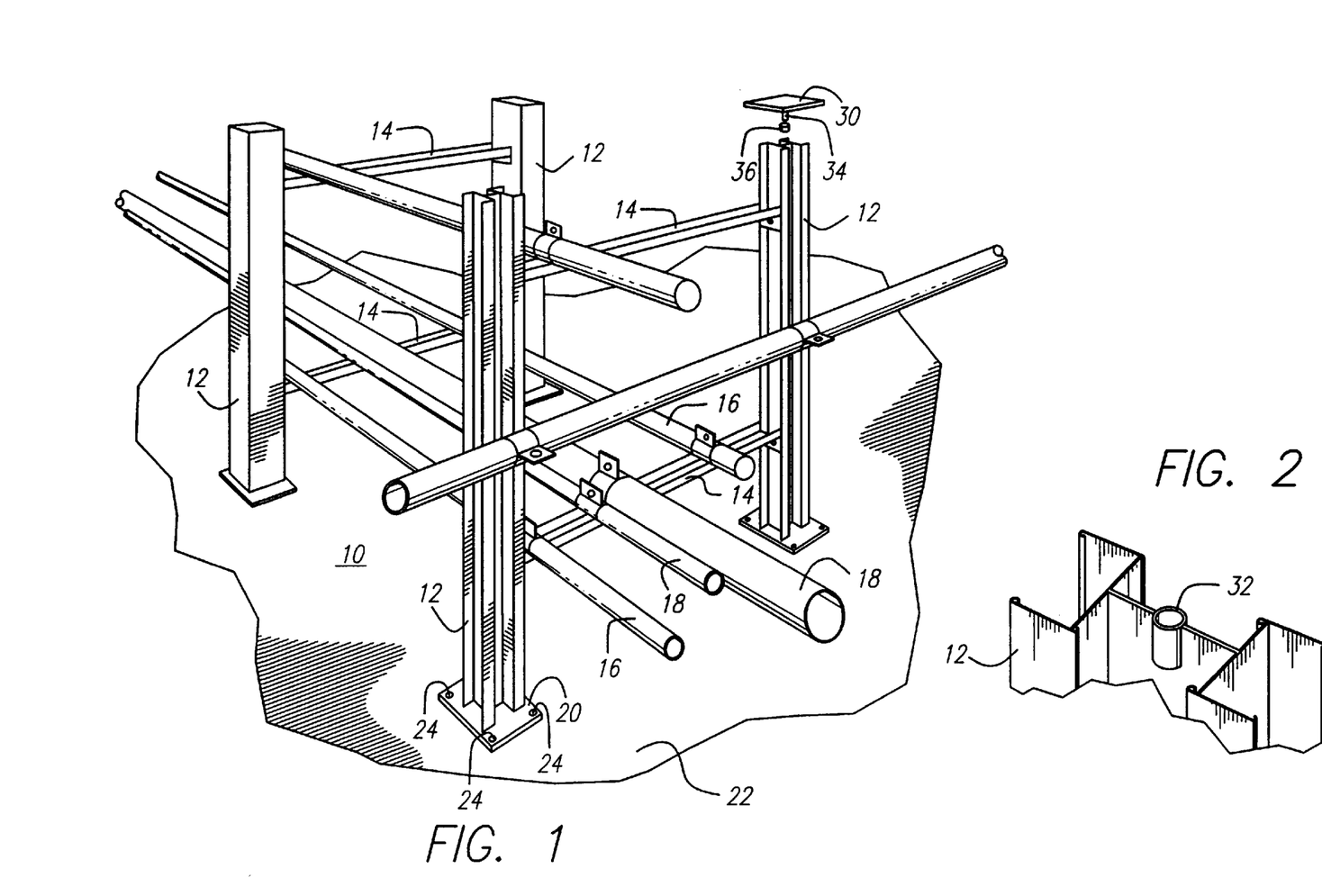
FIG. 1 illustrates the struts and racks for supporting transmission lines and conduits in a crawl space between a floor and a subfloor.
FIG. 2 is a partial top view of a strut illustrating a threaded receiver.

Referring to FIG. 1, there is shown an assembly 10 of struts 12 having interconnecting racks 14, each of which is capable of supporting one or more transmission lines (representatively identified by numeral 16) and/or conduits (representatively identified by numeral 18). It is to be understood that the transmission lines refer to electric power lines, data transmission lines and other conductors, whether electric, fiber optic or other power or information conveying medium and that the term conduits refers to piping, tubing and the like for transmitting various liquids, gases or particles, including waste products to or from the equipment connected thereto. A plate 20 is secured to the lower end of each strut for attaching the strut to an underlying supporting surface 22. In the context of a clean room environment, the supporting surface is a subfloor, usually of concrete. Each of plates 20 may be secured to supporting surface 22 by means of studs 24 extending through plate 20; however, a preferred method of attachment is that of using an epoxy as an adhesive and encapsulating plate for rigidly securing the plate and for sealing the space between the plate and the supporting surface. Such sealing precludes collection and subsequent disbursement of foreign matter between the plate and the supporting surface. Moreover, the sealing of the plate prevents rusting or other chemical reaction at the plate, which could introduce contaminants to the clean room environment.

Each of struts 12 is set on two foot centers commensurate with the corners of two foot square tiles forming the floor of the clean room. A pedestal 30 is mounted at the upper end of each strut 12 to support a corner of each of four overlying floor tiles (not shown). Flanges (not shown) may be located on the upper surface of pedestal 30 to position the corner of each tile relative to the corners of the adjacent tiles. To ensure a level floor, pedestal 30 is in threaded engagement with the upper end of the respective stud. As shown in further detail in FIG. 2, a threaded receiver 32 may be attached to or formed at the center of strut 12 for threadedly engaging threaded shaft 34 extending from the bottom center of pedestal 30. A lock nut 36 may be employed to prevent inadvertent rotation of the pedestal. Thus, the height of each pedestal may be varied to ensure leveling of the overlying floor surface.

Figure 3:
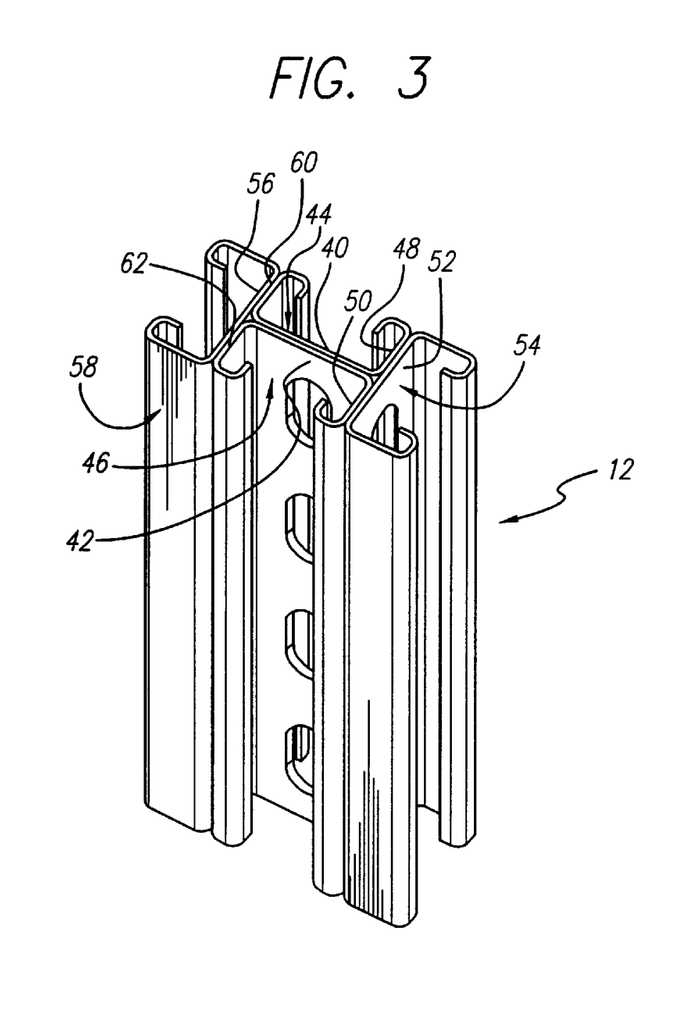
FIG. 3 illustrates the cross-section of a strut.

Strut 12 is illustrated in detail in FIG. 3. A C-channel having inwardly rolled edges of the legs extending from the base with elongated apertures disposed in the base is commercially available under the trademark "Unistrut". Strut 12 is formed by welding, or otherwise securing to one another the bases 40, 42 of two C-channels 44, 46 to orient the C-channels in opposed directions. With such attachment, leg 48 of C-channel 44 and leg 50 of C-channel 46 are in planar alignment with one another. Base 52 of a third C-channel 54 is welded or otherwise secured to each of legs 48,50 with the legs of C-channel 54 extending therefrom. Similarly, base 56 of a fourth C-channel 58 is welded or otherwise secured to planarly aligned legs 60,62 of C-channels 44,46, respectively. Thereby, the third and fourth C-channels extend in opposed directions.

Figure 4:
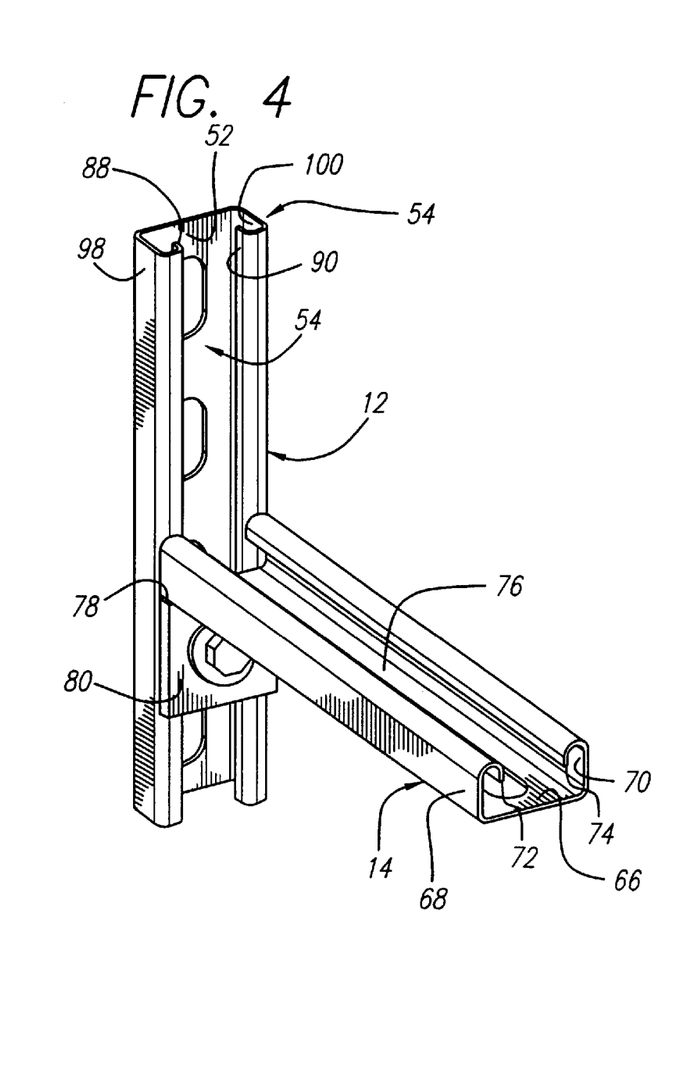
FIG. 4 illustrates a rack secured to one side of a strut.

Referring to FIG. 4, there is illustrated a rack 14 secured to one of C-channels 44,46,54 or 58 of strut 12 shown in FIG. 3. For clarity of illustration, only one C-channel is depicted in FIG. 4, which C-channel will be identified as C-channel 54 for description purposes. Legs 98,100 of C-channel 54 include rolled edges having inwardly oriented lips 88,90, respectively, extending toward base 52. These lips and the attendant legs are used as the primary structural member for securing rack 14 to a strut 12. The rack is formed of a C-channel essentially the same as each of the C-channels illustrated and described above and forming a part of strut 12.

Figure 5:
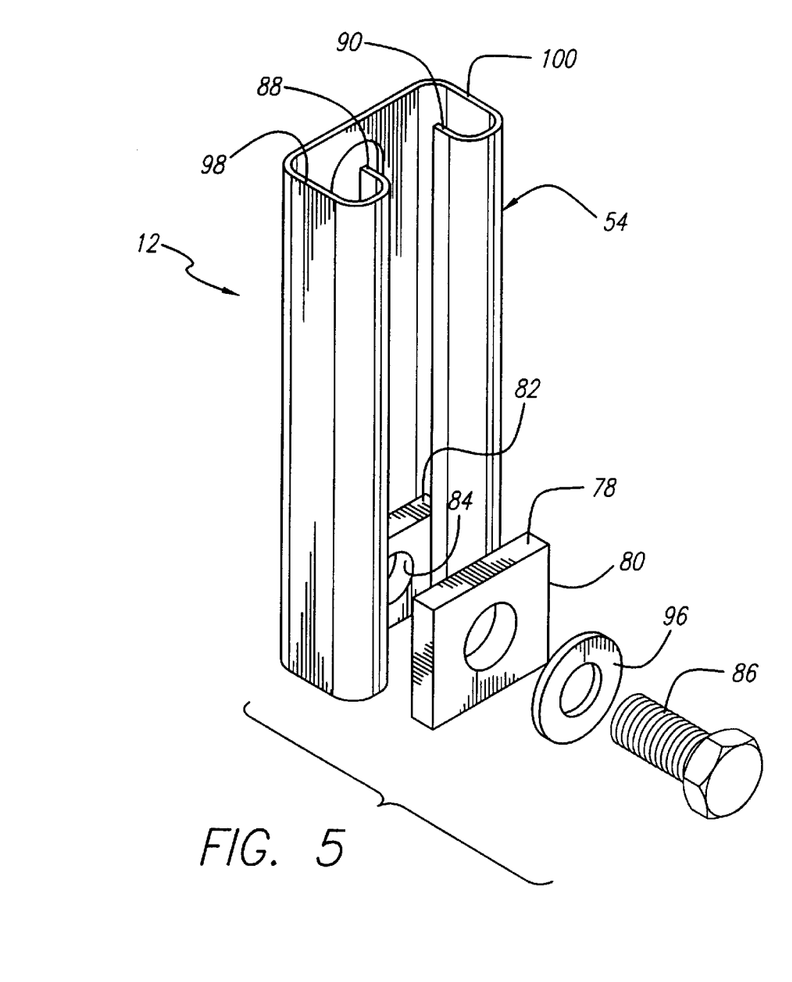
FIG. 5 illustrates a mechanism for positioning and securing a rack to one side of a strut, such as the strut shown in FIG. 4.
Figure 6:
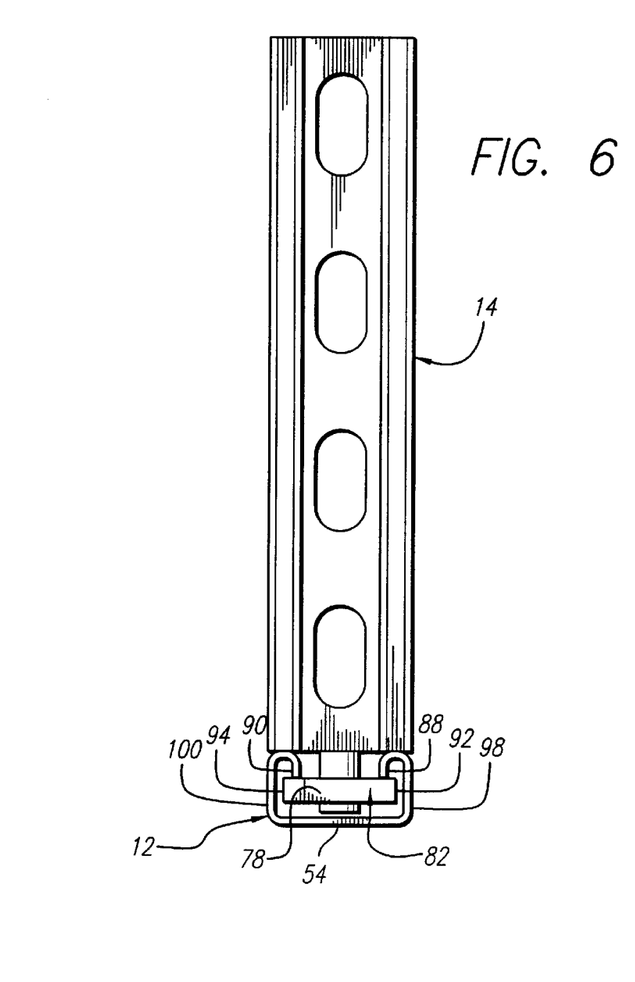
FIG. 6 illustrates a top view of a rack secured to one side of a strut.

The following discussion of a securing device to secure rack 14 to strut 12 will be described with joint reference to FIGS. 4, 5 and 6. An end of base 76 of C-channel 66 forming rack 14 is welded or otherwise secured to an edge 78 of an apertured plate 80. A nut 82 includes a threaded passageway 84 for threaded engagement with bolt 86. The nut may be rectangular in plan form, as illustrated, to permit passage of the nut intermediate lips 88,90 of C-channel 54 when the nut is oriented in one direction. Upon rotation of the nut approximately 90 degrees (90°), opposed ends 92,94 of the nut extend laterally past lips 88,90 to prevent withdrawal of the nut. A conventional washer 96 is penetrably engaged by bolt 86 and against which the head of the bolt bears upon tightening of the bolt.

To assemble rack 14 with a C-channel of strut 12, represented by C-channel 54, bolt 86 is penetrably engaged with washer 96 and plate 80 into an initial threaded engagement with nut 82. By orienting the nut to place its longitudinal axis essentially in alignment with the longitudinal axis of C-channel 54, the nut will pass past lips 88,90. Upon angularly reorienting the nut approximately 90 degrees, ends 92,94 of the nut interferingly engage with lips 88,90 and such interference prevents withdrawal of the nut. Upon tightening bolt 86, rack 14 is drawn against the rolled over part of legs 98,100 of C-channel 54, as particularly depicted in FIG. 6. The resulting frictional engagement will prevent translation of rack 14 along C-channel 54 and will also prevent rotation of the rack about the axis of rotation represented by bolt 86. It is to understood that the opposed end of rack 14 includes a similar plate 80 attached thereto and such plate is similarly attached to a corresponding C-channel of an adjacent strut.

Referring jointly to FIGS. 7, 8, 9, 10 and 11, a clamp 102 for attaching either a transmission line 16 or a conduit 18 to a C-channel of a strut 12 or to a rack 14 will be described. Clamp 102 includes two mirror image sections 104,106 having one end in the mechanical interlocking engagement with a C-channel and the other ends of the sections are joined by an attachment mechanism, such as bolt 108 and nut 110. Distal end 112 of section 104 includes open slots 114,116 defined in part by prongs 118,120, respectively. Upon mounting of section 104 of clamp 102 within a C-channel, such as C-channel 54 of strut 12 illustrated in FIG. 11, prongs 118,120 become located within the folded over space defined by lip 88, leg 98, and lip 90, leg 100. The resulting physical engagement by lips 88,90 with a corresponding sides of slots 114,116, respectively, and the capture of prongs 118,120 in the folded over section of legs 98,100, respectively, preclude withdrawal of distal end 112 of section 104 from within C-channel 54. Section 106 of clamp 102 is identical with section 104 and is retainingly engaged within C-channel 54 in the manner described above with respect to section 104. Because of such commonality, common reference numerals have been allocated to corresponding elements.

Each of sections 104,106 includes a curved segment 122,124, which curved segment corresponds generally, but not necessarily precisely with the curvature of the transmission line or conduit to be clamped by clamp 102. As evident from FIG. 9, distal end 112 of each of sections 104,106 of clamp 102 is essentially parallel with proximal end 126 of the corresponding section. Each proximal end of the sections of clamp 102 includes an aperture 128 for penetrably receiving bolt 108.

Figure 7:
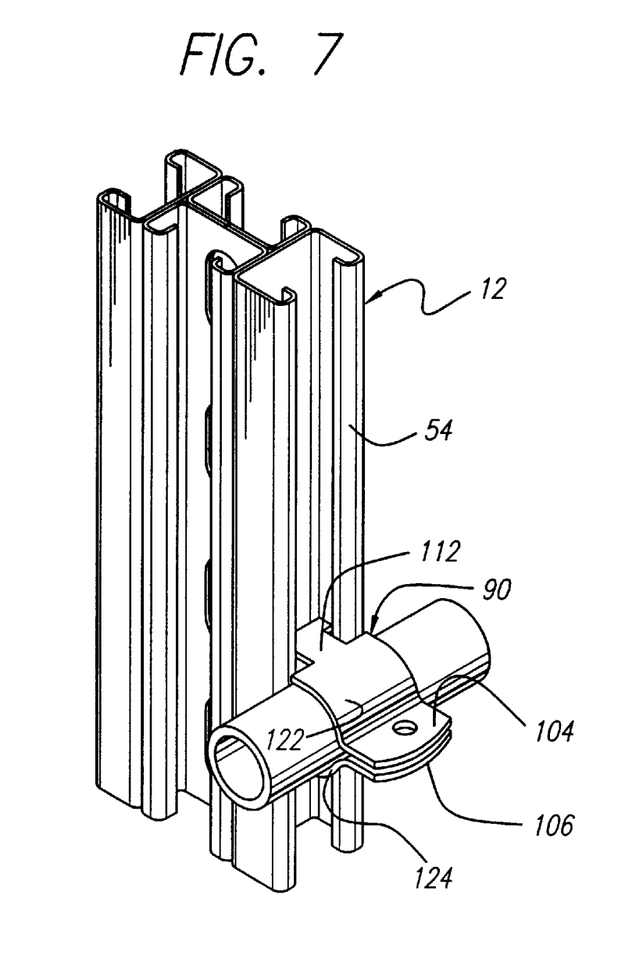
FIG. 7 illustrates a clamp for attaching a transmission line or a conduit to one side of a strut.
Figure 8:
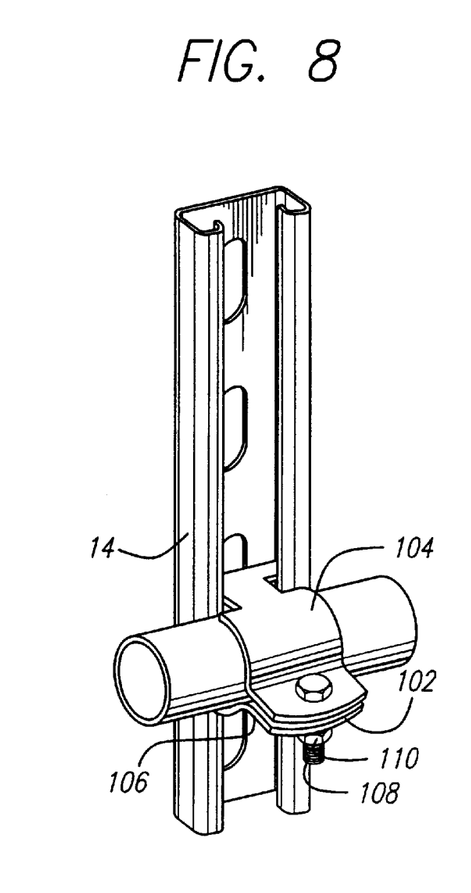
FIG. 8 illustrates a clamp for attaching a transmission line or a conduit to a rack.
Figure 9:
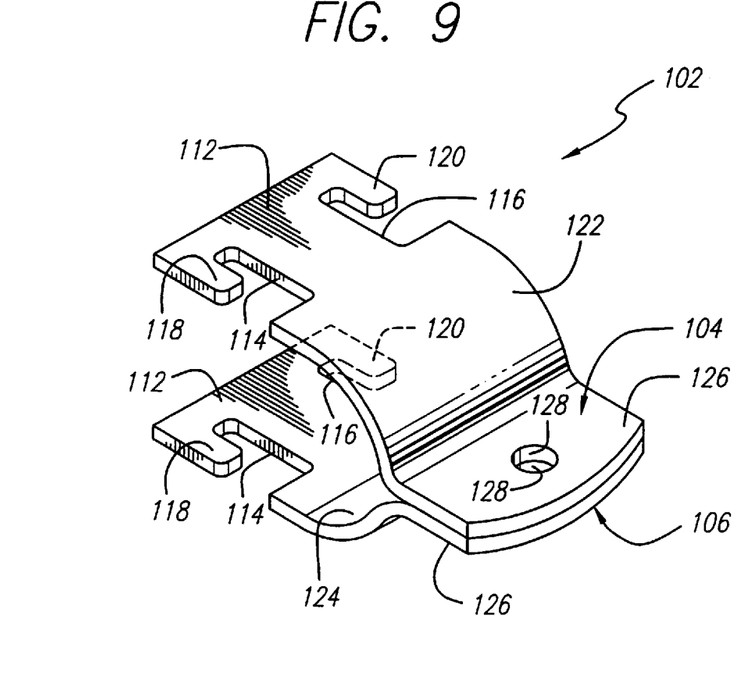
FIG. 9 illustrates two parts of a clamp.
Figure 10:
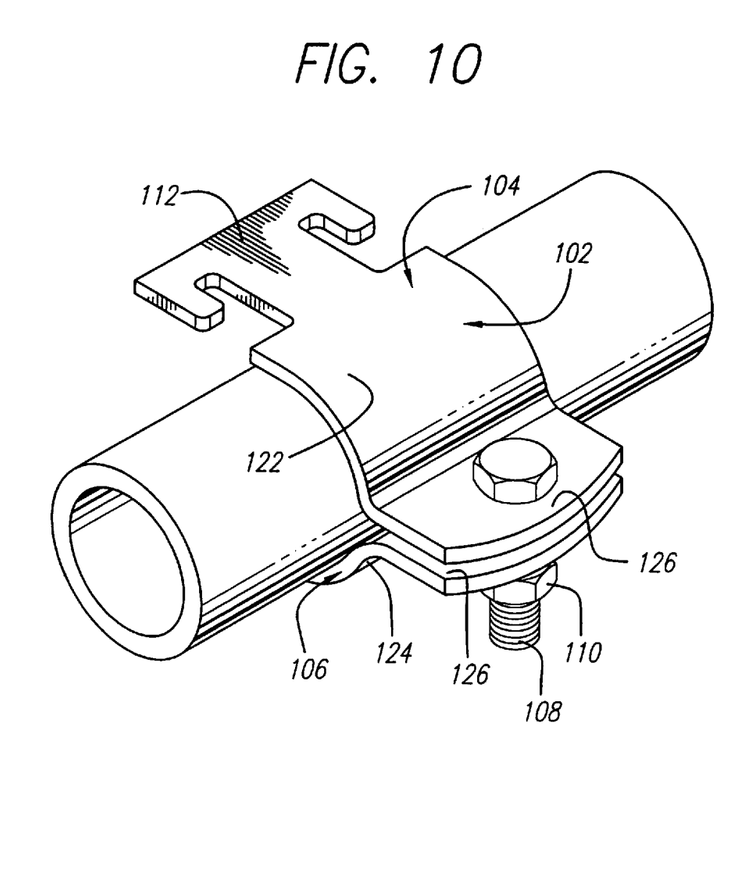
FIG. 10 illustrates a clamp enveloping a transmission line or a conduit.
Figure 11:
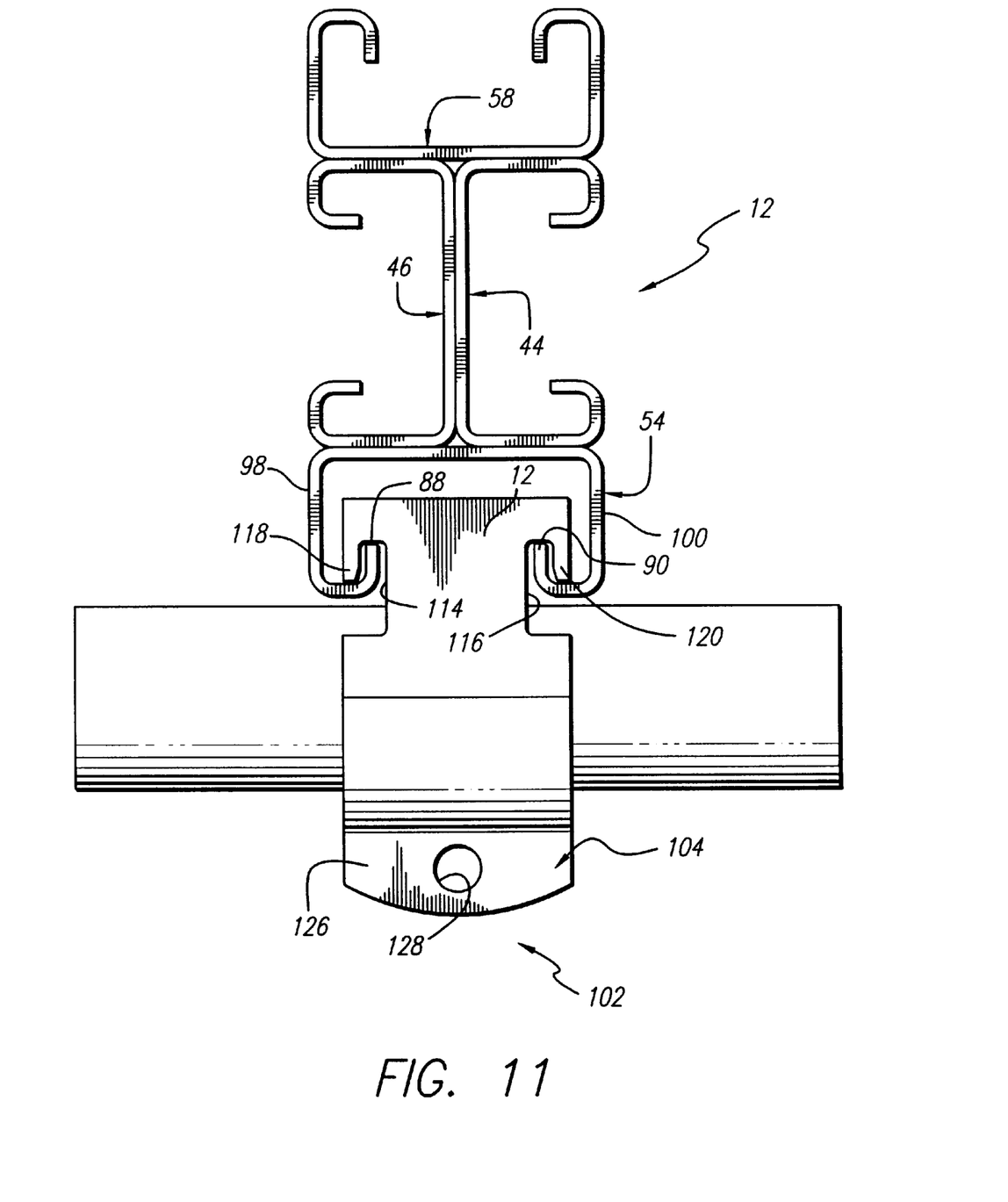
FIG. 11 is a top view illustrating a transmission line or a conduit secured to one side of a strut.

To install a clamp 102 on either rack 14 (see FIG. 8) or upon one of the C-channels of strut 12, see FIG. 7 and 11, section 104 of clamp 102 is rotated about its longitudinal axis to insert distal end 112 within the corresponding C-channel. After insertion, the section is rotated and pulled outwardly to bring about insertion of lips 88,90 into slots 114,116 and thereby locate prongs 118,120 intermediate the corresponding lip and leg, as shown particularly in FIG. 11. Section 106, oriented as a mirror image of section 104, is similarly inserted within the corresponding C-channel on the other side of a transmission line or conduit to be clamped. Both sections are brought together on opposed sides of the transmission line or conduit to position curved segments 122,124 thereagainst. An attachment mechanism, such as bolt 108 is inserted through apertures 128 in proximal ends 126 of the clamp and secured by nut 110. A resulting compression of the transmission line or conduit between opposed curved segments 122,124 will retain a corresponding transmission line or conduit in place adjacent the strut or rack. Because of the frictional interaction between clamp 102 and the corresponding C-channel to which it is attached, any movement of the transmission line or conduit along with clamp 102 will be greatly resisted; and, under all but extreme circumstances, the transmission line or conduit will be retained in place.

To relocate or positionally move a transmission line or a conduit, the attachment mechanism for retaining sections 104,106 together is removed, such as by unthreading nut 110 from bolt 108 and withdrawing the bolt. Thereafter, each section of clamp 102 may be rotated about its respective longitudinal axis to bring about disengagement of the respective distal ends from within the corresponding C-channel. Complete removal of the transmission line or conduit or the replacement along the same or different rack or strut may then be effected.

Each of struts 12 is located in a pattern of two foot centers corresponding with the corners of overlying floor tiles. Since the length of the struts is controlled by the space between the subfloor and the floor, all struts may be precut prior to installation. The availability of such preparatory work prior to installation completely avoids the need for workmen to cut the struts at the worksite or within the crawl space between the subfloor and the floor. The resulting savings over present methods is significant. Each of racks 14 is dimensioned to extend between facing channels of adjacent struts located on two foot centers. Thereby, the racks may be precut prior to installation with the corresponding apertured plates having previously been welded thereto. Upon installation, a workman need only attach the racks at the appropriate heights and between pairs of the struts as necessary to support the transmission lines and conduits to be installed. The savings in time, effort and convenience to the workman in having such precut racks and thereby avoid the need for on-site measurement and cutting, as is presently the case, represent significant cost and labor savings. The use of the clamps described and illustrated herein renders attachment of each transmission line or conduit a very fast and essentially foolproof procedure requiring only minimal skills. Because of the potential significant variation of the diameter of the transmission lines and conduits, several sets of differently dimensioned clamps may be necessary; however, the selection of appropriately sized clamps is a simple matter easily learned. To rearrange the racks in response to rerouting/replacement of transmission lines and conduits, disassembly and removal of a rack is very simple matter of unscrewing bolt 86 and removing corresponding nut 82 from within the respective C-channel. Furthermore, each of the racks and attachment nuts, bolts and washers may be reused with a resulting significant cost savings. Moreover, each of clamps 102 and corresponding attachment mechanisms may be reused since disassembly will not cause damage.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. Apparatus for supporting transmission lines and conduits between a subfloor and a floor, said apparatus comprising in combination:
   (a) a plurality of struts for extending upwardly from the subfloor, each strut of said plurality of struts comprising four orthogonally oriented C-channels, each of said C-channels including an elongated base and a pair of opposed legs extending from said base, two C-channels of said plurality of C-channels being joined base to base to locate a first pair of corresponding legs extending in opposed directions to define a first common plane and to locate a second pair of corresponding legs extending in opposed directions to define a second common plane, a third C-channel of said plurality of C-channels having its base joined to said pair of legs defining the first common plane, and a fourth C-channel of said plurality of C-channels having its base joined to said pair of legs defining the second common plane;
   (b) a plurality of racks, each rack comprising a C-channel extending from a C-channel of one strut to a C-channel of another strut of said plurality of struts;
   (c) a securing device for detachably attaching each end of each of said racks to corresponding C-channels of a pair of struts of said plurality of struts, each said securing device comprising an apertured plate secured to an end of said rack, a nut removably captured by the correspondingly C-channel of said strut and a bolt penetrating said plate and threadedly engaging said nut to draw the end of said rack into engagement with the C-channel; and
   (d) a plurality of clamps for clamping selected ones of transmission lines and conduits to selected ones of the C-channels of said plurality of struts and to the C-channels of said plurality of racks.

2. The apparatus as set forth in claim 1 wherein each said strut includes a plate for attachment to the subfloor and a further plate for supporting the floor.

3. The apparatus as set forth in claim 2 wherein said further plate is vertically repositionable relative to the attached strut.

4. The apparatus as set forth in claim 1 wherein each clamp of said plurality of clamps includes first and second sections having distal ends engageable with the selected C-channel of said struts and of said racks, each of said first and second sections including curved segments for partly circumscribing a clamped respective transmission line and conduit and a proximal end, and an attachment mechanism for securing said proximal ends to retain the respective transmission line and conduit with said clamp.

5. The apparatus as set forth in claim 4 wherein each said leg of said C-channels of said plurality of struts and said plurality of racks comprises a curved over leg, each said leg having an edge defining a lip extending toward the base of the C-channel and wherein each said distal end of said first and second sections includes a slot for receiving each lip of the engaged C-channel.

6. The apparatus as set forth in claim 5 wherein each said distal end includes a prong defining a part of each said slot for insertion intermediate the lip and the corresponding leg of the C-channel.

7. The apparatus as set forth in claim 4 wherein said attachment mechanism comprises a nut and a bolt penetrably engaging each of said proximal ends of each clamp of said plurality of clamps.

8. The apparatus as set forth in claim 1 wherein each strut of said plurality of struts is displaced from one another on two foot centers in a rectangular pattern.

9. The apparatus as set forth in claim 1 wherein each strut of said plurality of struts is of uniform length commensurate with the distance between the subfloor and the floor and wherein each rack of said plurality of racks is of uniform length commensurate with the spacing between rectilinearly aligned pairs of struts of said plurality of struts.

10. A method for supporting transmission lines and conduits between a subfloor and a floor, said method comprising the steps of:
   (a) locating a plurality of upwardly extending struts upon the subfloor, each of the struts having four orthogonally oriented C-channels, each of the C-channels including an elongated base and a pair of opposed legs extending from the base, two C-channels of the plurality of C-channels being joined base to base to locate a first pair of corresponding legs extending in opposed directions to define a first common plane and to locate a second pair of corresponding legs extending in opposed directions to define a second common plane, a third C-channel of the plurality of C-channels having its base joined to the pair of legs defining the first common plane, and a fourth C-channel of the plurality of C-channels having its base joined to the pair of legs defining the second common plane;
   (b) positioning racks between selected adjacent struts, each of the racks including a C-channel;
   (c) detachably attaching the ends of each rack to corresponding C-channels of a pair of struts, said step of detachably attaching including the steps of penetrably inserting a bolt through an apertured plate extending from an end of the rack into threaded engagement with a nut captured in a C-channel of a strut and turning the bolt to draw the end of the rack against the C-channel of the strut; and
   (d) clamping selected ones of transmission lines and conduits to selected ones of C-channels of the struts and C-channels of the racks.

11. The method as set forth in claim 10 wherein said step of clamping includes the step of capturing the distal ends of two sections of a clamp in the respective C-channel, locating the respective transmission line or conduit intermediate curved segments of the sections and drawing proximal ends of the sections toward one another to retain the respective transmission line or conduit clamped between the two sections.

12. The method as set forth in claim 11 including the steps of unclamping the respective transmission line or conduit from an engaged clamp to relocate the respective transmission line or conduit.

13. The method as set forth in claim 12 including the step of detaching a rack from the engaged struts comprising the step of threadedly loosening the bolt from the nut to permit withdrawal of the nut from within the respective C-channel of the strut.

14. The method as set forth in claim 11 wherein each C-channel includes a pair of legs, each leg having a curved over edge defining a lip extending toward the base of the C-channel and wherein said step of clamping includes the step of capturing the distal ends of each section with the lips of the C-channel.

15. Apparatus for supporting a selected plurality of transmission lines and conduits, said apparatus comprising in combination:
   (a) a plurality of struts for providing support in one axis for the selected transmission lines and conduits, each strut of said plurality of struts including four C-channels oriented orthogonal to one another, each of said C-channels including an elongated base and a pair of opposed legs extending from said base, two C-channels of said plurality of C-channels being joined base to base to locate a first pair of corresponding legs extending in opposed directions to define a first common plane and to locate a second pair of corresponding legs extending in opposed directions to define a second common plane, a third C-channel of said plurality of C-channels having its base joined to said pair of less defining the first common plane, and a fourth C-channel of said plurality of C-channels having its base joined to said pair of legs defining the second common plane;
   (b) a plurality of racks for supporting the transmission lines and conduits and for preventing movement of the transmission lines and conduits in another axis, each rack of said plurality of racks being formed as a C-channel;
   (c) a securing device for securing each end of each rack of said plurality of racks to a C-channel of one strut of said plurality of struts; and
   (d) a clamp for clamping a selected transmission line or conduit to a C-channel of one strut of said plurality of struts or to a C-channel of one rack of said plurality of racks.

16. Apparatus for supporting a selected plurality of transmission lines and conduits, said apparatus comprising in combination:
   (a) a plurality of struts for providing support in one axis for the selected transmission lines and conduits, each strut of said plurality of struts including four C-channels oriented orthogonal to one another;
   (b) a plurality of racks for supporting the transmission lines and conduits and for preventing movement of the transmission lines and conduits in another axis, each rack of said plurality of racks being formed as a C-channel;

(c) C-channels of said plurality of struts and C-channels of said plurality of racks being essentially identical in size and configuration;

(d) a securing device for securing each end of each rack of said plurality of racks to a C-channel of one strut of said plurality of struts; and (e) a clamp for clamping a selected transmission line or conduit to a C-channel of one strut of said plurality of struts or to a C-channel of one rack of said plurality of racks.

17. The apparatus as set forth in claim 15 wherein said securing device includes an apertured plate depending from each end of each rack of said plurality of racks, a nut removably insertable and retainable within a C-channel of a strut of said plurality of struts and a bolt penetrably engageable with said plate and threadedly engageable with said nut for drawing said plate against the C-channel of said strut upon rotation of said bolt in one direction.

18. The apparatus as set forth in claim 15 wherein said clamp comprises two sections, each of said sections having a distal end removably and lockably engageable with a C-channel of a strut of said plurality of struts or a C-channel of a rack of said plurality of racks, each of said sections including a curved segment for contacting a transmission line or a conduit to be clamped, each of said sections further including a proximal end and an attachment mechanism for engaging said proximal ends to lock said clamp to the corresponding C-channel and retain the transmission line or conduit within said clamp.

19. The apparatus as set forth in claim 18 wherein said securing device includes an apertured plate depending from each end of each rack of said plurality of racks, a nut removable insertable and retainable within a C-channel of a strut of said plurality of struts and a bolt penetrably engageable with said plate and threadedly engageable with said nut for drawing said plate against the C-channel of said strut upon rotation of said bolt in one direction.

20. The apparatus as set forth in claim 18 wherein each C-channel of said plurality of struts and of said plurality of racks includes opposed legs having curved over edges defining a pair of inwardly facing lips and wherein said distal end of each section of the clamp includes a pair of slots for receiving the lips.

21. The apparatus as set forth in claim 20 wherein each slot is defined in part by a prong for insertion within the C-channel between the corresponding lip and leg.

22. Apparatus for supporting a selected plurality of transmission lines and conduits, said apparatus comprising in combination:

(a) a plurality of struts for providing support in one axis for the selected transmission lines and conduits, each strut of said plurality of struts including four C-channels oriented orthogonal to one another each strut of said plurality of struts comprises first and second C-channels having their respective bases attached to one another to locate respective correspondingly legs in planar relationship with one other, a third C-channel having its base attached to one pair of planar legs of the first and second C-channels, and a fourth C-channel having its base attached to another pair of planar legs of the first and second C-channels;

(b) a plurality of racks for supporting the transmission lines and conduits and for preventing movement of the transmission lines and conduits in another axis, each rack of said plurality of racks being formed as a C-channel;

(c) a securing device for securing each end of each rack of said plurality of racks to a C-channel of one strut of said plurality of struts; and (d) a clamp for clamping a selected transmission line or conduit to a C-channel of one strut of said plurality of struts or to a C-channel of one rack of said plurality of racks.

23. The apparatus as set forth in claim 15 wherein each strut of said plurality of struts includes a plate disposed at one end for mounting said strut upon a surface.

24. The apparatus as set forth in claim 23 wherein each strut of said plurality of struts includes a positionally adjustable plate disposed at an other of said strut for supporting an element at an adjustable distance from the one end.

* * * * *